United States Patent
Ashmann

(10) Patent No.: US 10,253,698 B2
(45) Date of Patent: Apr. 9, 2019

(54) MULTI-CYCLE STRATIFIED INTERNAL COMBUSTION SYSTEM

(71) Applicant: Marshall Ashmann, Aurora, CO (US)

(72) Inventor: Marshall Ashmann, Aurora, CO (US)

(*) Notice: Subject to any disclaimer, the term of this patent is extended or adjusted under 35 U.S.C. 154(b) by 803 days.

(21) Appl. No.: 14/927,182

(22) Filed: Oct. 29, 2015

(65) Prior Publication Data

US 2017/0122265 A1 May 4, 2017

(51) Int. Cl.
| | |
|---|---|
| *F02B 47/08* | (2006.01) |
| *F02C 7/236* | (2006.01) |
| *F02K 7/06* | (2006.01) |
| *F02B 71/06* | (2006.01) |
| *F02C 5/12* | (2006.01) |
| *F02B 3/04* | (2006.01) |

(52) U.S. Cl.
CPC ............ *F02C 7/2365* (2013.01); *F02B 3/04* (2013.01); *F02B 71/06* (2013.01); *F02C 5/12* (2013.01); *F02K 7/06* (2013.01)

(58) Field of Classification Search
CPC ......... F02M 25/07; F02C 5/12; F02C 7/2365; F02K 7/06; F02K 7/04; F02B 71/06; Y02T 10/121
USPC ............ 123/568.11, 568.13; 60/39.38–39.4, 60/39.64, 39.76–39.81, 726, 727
See application file for complete search history.

(56) References Cited

U.S. PATENT DOCUMENTS

| | | | | |
|---|---|---|---|---|
| 3,921,594 A * | 11/1975 | Lampard | ................ | F02B 53/02 123/243 |
| 5,769,610 A * | 6/1998 | Paul | ................ | F02B 63/06 417/228 |
| 9,175,641 B2 * | 11/2015 | Ashmann | ................ | F02K 7/06 |
| 2008/0155985 A1 * | 7/2008 | Labrador | ................ | F01K 27/00 60/698 |
| 2014/0261288 A1 * | 9/2014 | Coney | ................ | F02G 3/00 123/197.1 |
| 2014/0261341 A1 * | 9/2014 | Ashmann | ................ | F02K 7/06 123/568.11 |

* cited by examiner

*Primary Examiner* — John Kwon

(74) *Attorney, Agent, or Firm* — Ramon L. Pizarro; Edwin N. Crabtree

(57) ABSTRACT

An internal combustion engine that uses stratification of gasses for compressing air is disclosed. The engine uses a combustion chamber that delivers products of combustion into an elongated compression chamber to drive the products of combustion against resident air within the elongated compression chamber, and push the resident air into a compressed air chamber. After driving the resident air into the compressed air chamber, the products of combustion are used with work-producing devices. Air is then driven into the compression chamber by an air pump or low-pressure compressor to once again fill the compression chamber with fresh air. The air in the compressed air chamber is then delivered to the combustion chamber and used for combustion. Fuel is delivered to the combustion chamber by a fuel injector, and ignited by the heat of the compressed air and/or a glow plug, spark plug, or similar ignition device.

5 Claims, 13 Drawing Sheets

(START-UP)

(FUEL INJECTION)

(COMBUSTION)

(EXPANSION/COMPRESSION)

(CHECK VALVE CLOSES)

(EXHAUST)

(EXPANSION CHAMBER PURGE)

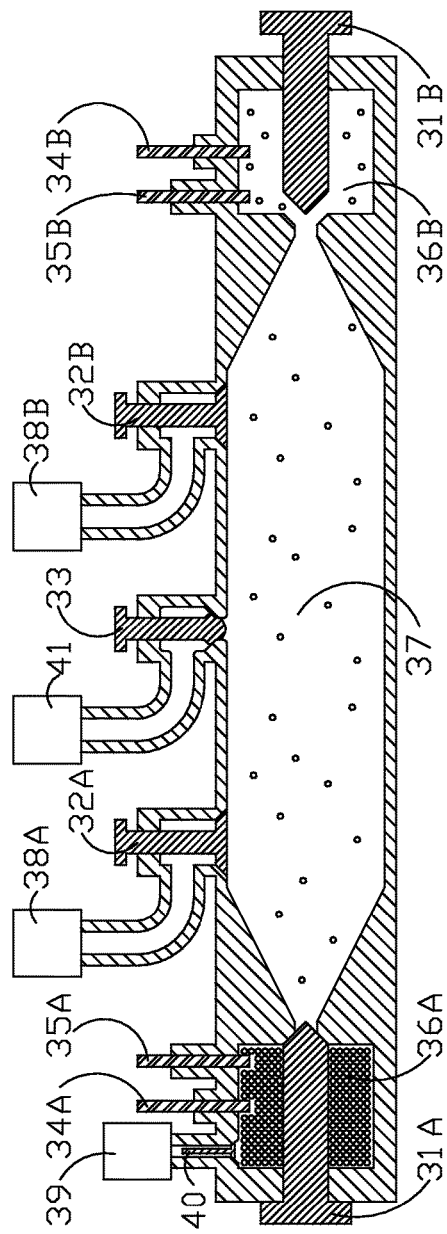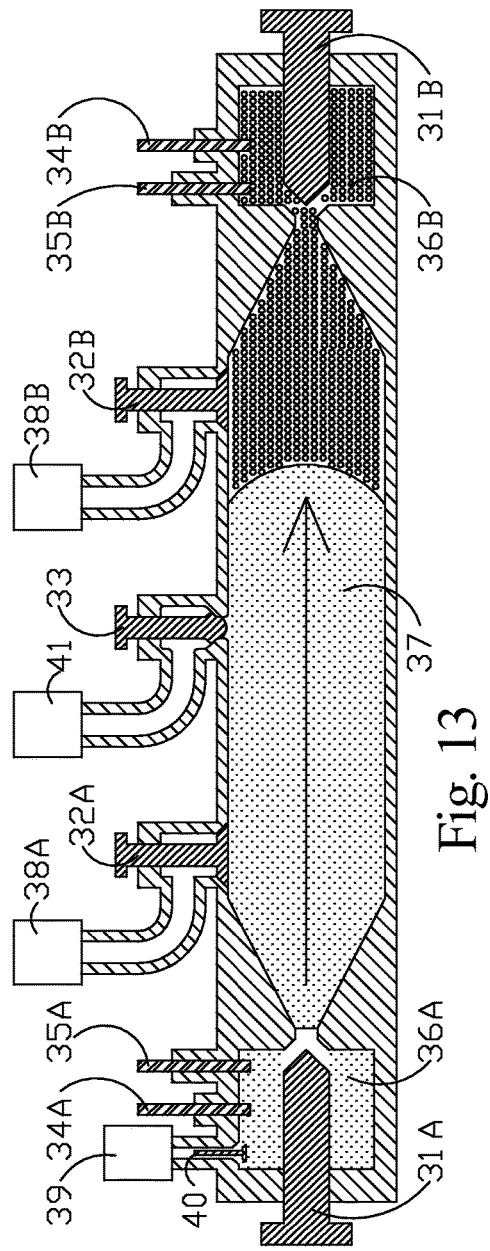

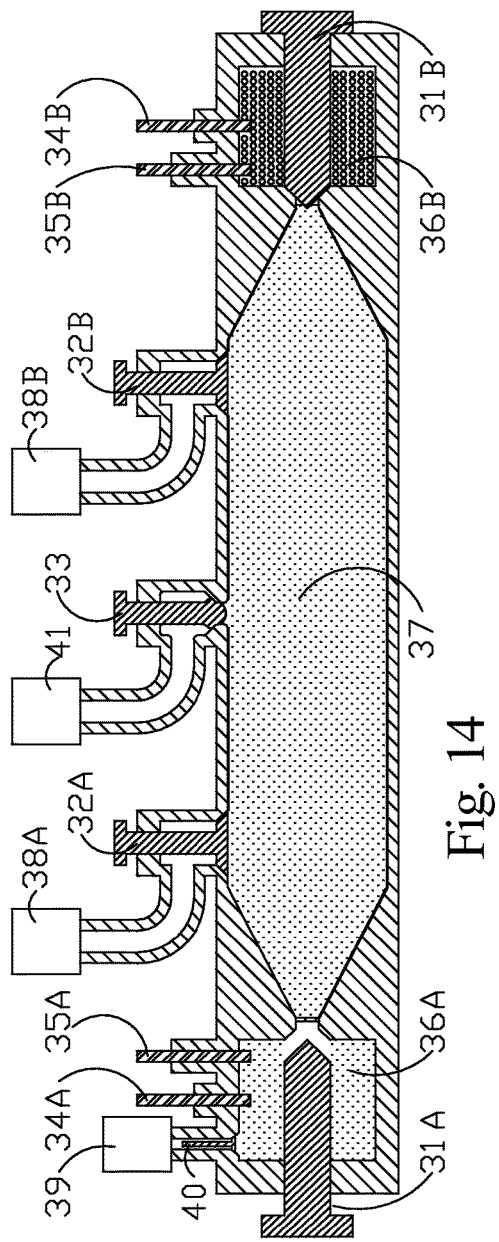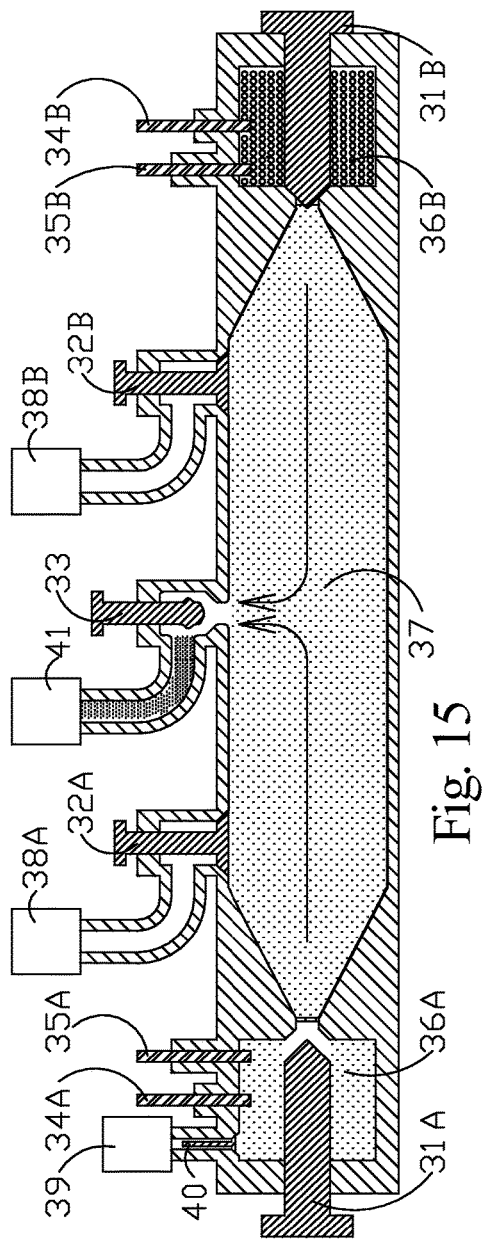

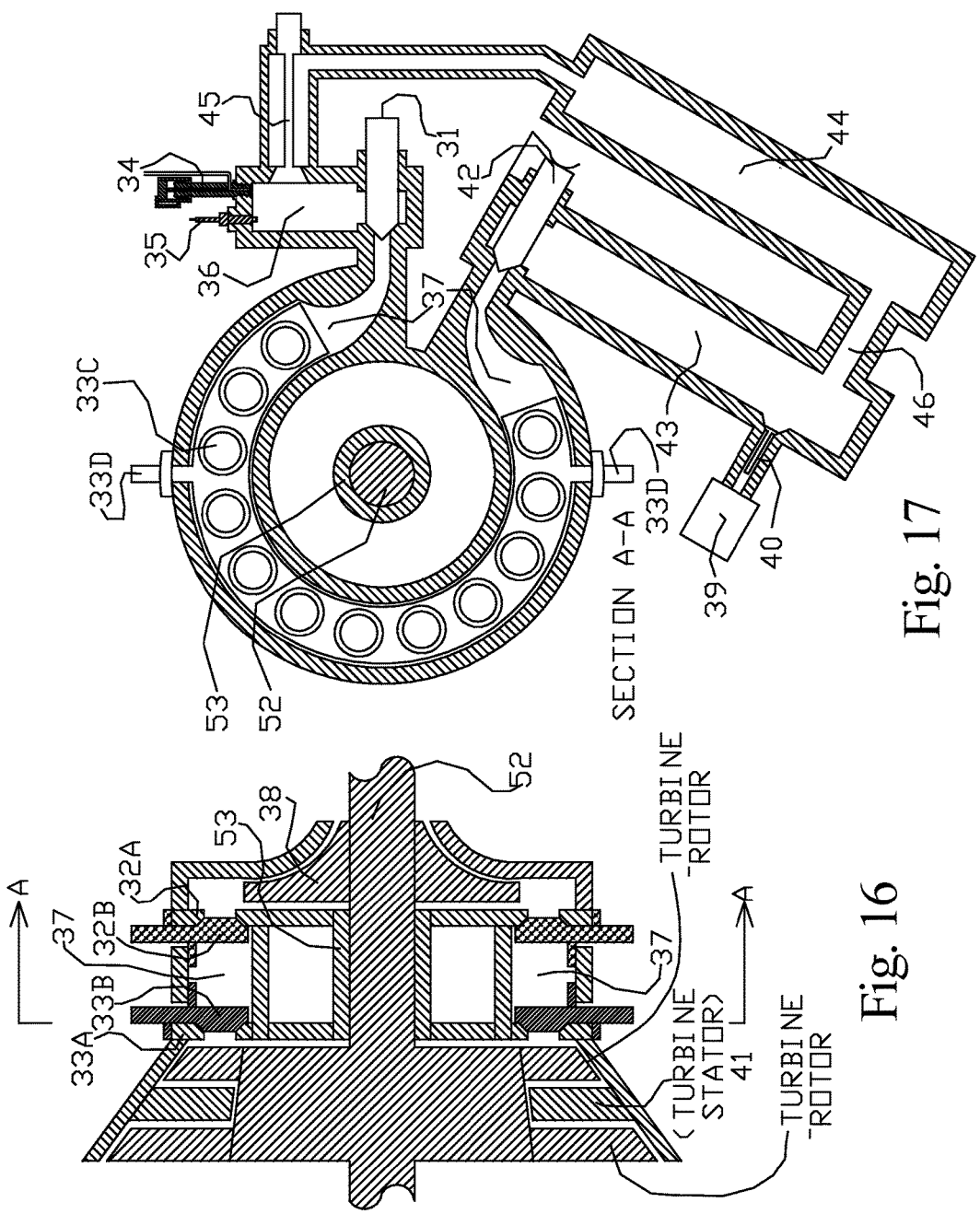

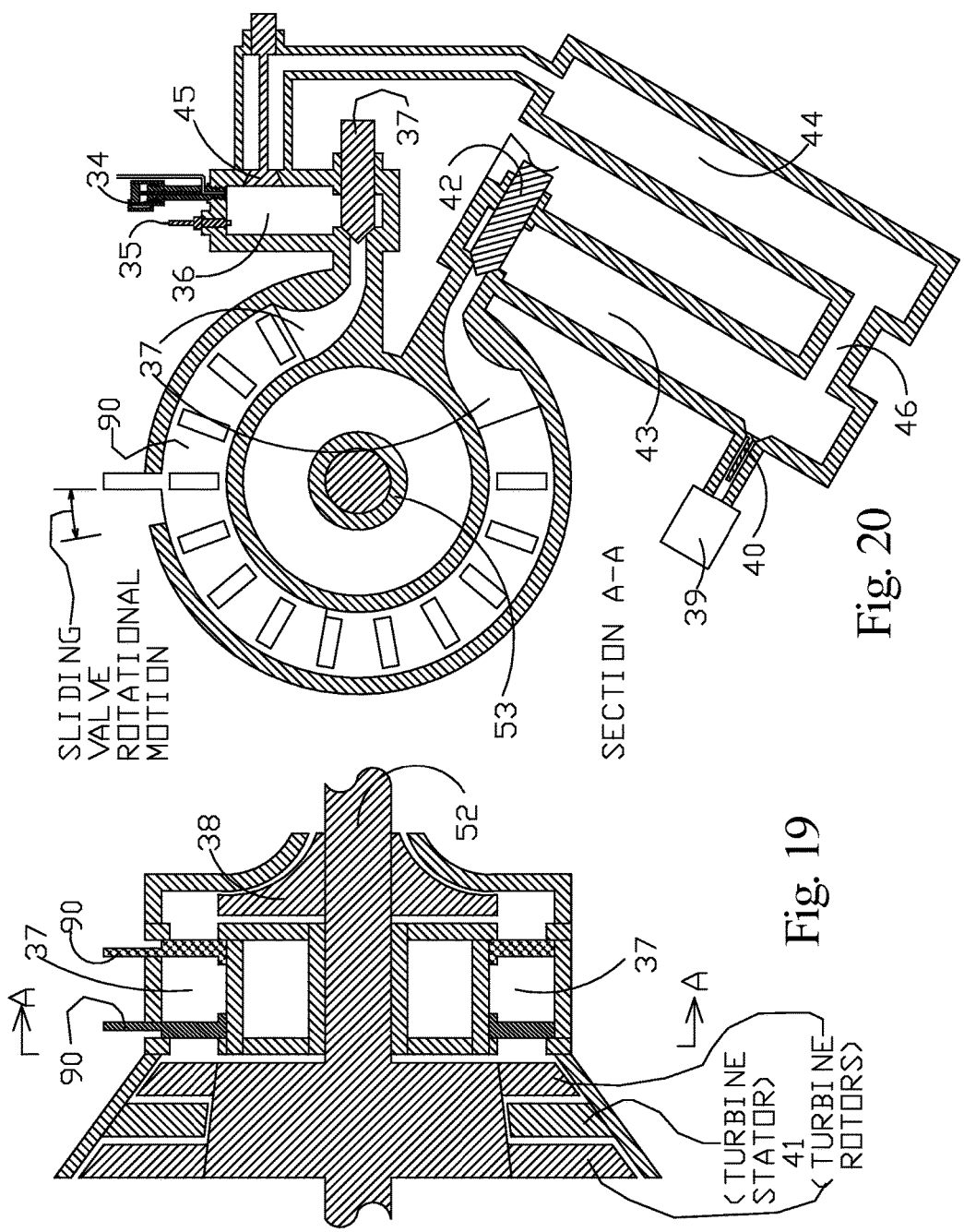

MULTI-CYCLE STRATIFIED INTERNAL COMBUSTION SYSTEM

REFERENCE TO RELATED APPLICATIONS

This application is a continuation of my application having Ser. No. 13/841,988, now U.S. Pat. No. 9,175,641, which is incorporated herein in its entirety by reference.

BACKGROUND OF THE INVENTION (a) Field of the Invention

This application relates to a system and mechanism for capturing the products of combustion to produce useful work. More particularly, but not by way of limitation, to a system that uses gas or air stratification to pressurize and mobilize gasses in order to distribute them to locations where the mobilized gasses are used to perform useful work.

(b) Discussion of Known Art

There are many known examples of internal combustion engines that use what is referred to as "charge stratification". Charge stratification as used in these engines typically refers to the provision of a relatively small, segregated, combustion chamber where combustion takes place. The use of this segregated combustion chamber allows combustion to be initiated in a confined space where a rich mixture can be created with less fuel than what is needed in the cylinder of traditional piston engines, where the combustion mixture is created between the piston and the valves of the engine, which creates a larger volume than what is used in the segregated chamber of stratified charge engines.

Another approach at using combustion gasses is found in U.S. Pat. No. 1,983,405 to Schmidt, which discloses the use of an explosion in an elongated combustion chamber to create propulsion forces, such as the forces used to propel aircraft.

Air stratification is often witnessed in large, vertically open areas, where temperature gradients are observed as strata or layers of air. These stratified layers of air demonstrate that mixing of air often does not occur without some mechanical assistance, such as with a fan.

Accordingly, the fact that air, or similar gasses, can be stratified has not been fully exploited for the purpose of creating an internal combustion engine.

SUMMARY

It has been discovered that an internal combustion engine that takes advantage of stratification of air can be made, an example of the engine includes:

an elongated compression chamber having a first end and a second end with an intake valve next to the first end and an exhaust valve that is located next to the second end;

a combustion chamber that is in fluid communication with the first end of the compression chamber, having a fuel inlet, a compressed air inlet and a fuel igniter; and a compressed air chamber that is connected to the second end of the compression chamber through a check valve (one-way valve).

With this embodiment, high pressure-high temperature exhaust gasses are first created in the combustion chamber and are then released into the compression chamber, which will be filled with a resident gas. The resident gas may be air or a mixture of air and vestiges of exhaust gasses from a previous cycle of combustion with the system. The sudden release of the exhaust gasses from the combustion chamber into the compression chamber will result in an expansion of the hot exhaust gasses against the resident gas that is contained within the compression chamber. It is contemplated that the inflow of exhaust gasses from the combustion chamber will compress the lower-pressure, lower-temperature, resident gas in the compression chamber. This compression is likely to be produced through the stratification, or non-mixing, of the exhaust gas from the combustion chamber as it advances against the resident gas. The stratification, or non-mixing, is improved by minimizing the area of contact between the exhaust gas and resident gas and by reducing turbulence and increasing laminar flow of the gasses in the compression chamber though use of a smooth and aerodynamic design of the outlet valve, outlet valve seat and compression chamber. This stratification will result in the compression and movement of the resident gas towards the check valve that connects the compression chamber and the compressed air chamber. To achieve preferred operation, the ratios of the volumes of the combustion chamber, compression chamber and compressed air chamber are such that all of the compressed air and only a minimal amount of exhaust gasses enter the compressed air chamber.

Adjustments of the volume ratios will be required by someone knowledgeable in the field of internal combustion in order to achieve maximum power and/or efficiency and/or reduced exhaust pollutants. It is also envisioned that an ability to alter the volume ratios might have to be incorporated into the design to achieve maximum power and/or efficiency and/or reduced exhaust pollutants under different power outputs.

It will be understood that the stratification is favored due to the elongated shape of the combustion chamber. The term "elongated" as used herein refers to something that has a length of a magnitude that is significantly greater than the magnitude of any cross-sectional dimension. In the disclosed invention, it is preferred that the distance between the first end and the second end of the compression chamber will be several times the distance across any section of the compression chamber.

THEORY OF THE INVENTION

If one places an explosive charge such as a lit firecracker in one end if a long piece of pipe, then closes the pipe with pipe caps, the explosion will compress the air in the pipe to the opposite end of the pipe. Because of the high ratio of the length of the pipe to its diameter, there will be only a small amount of mixing of the explosion gasses and the air being compressed. The final conditions in the pipe will be burned high-temperature, high-pressure gasses from the firecracker's explosion filling most of the pipe and a small pocket of high-pressure air at the end of the pipe.

This invention replaces the firecracker with an explosion of a combustible mixture of compressed air and fuel. It then captures the resulting compressed air at the opposite end of the pipe and uses it for the next explosion. It then uses the residual burned gasses, whose temperature and pressure have been reduced by the work required to compress the air, to drive a work producing expansion-engine such as a turbine or a piston-cylinder arrangement.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 1A is a schematic of an example of the disclosed invention.

FIG. 1B is a schematic illustrating the use of the device shown in FIG. 1A in using the stratification between the products of combustion and the resident gas to both expand the products of combustion and compress air in the compressed air chamber. The compressed air (which had been the resident gas in the compression chamber) is stored in the compressed air chamber for later delivery into the combustion chamber.

FIG. 2 is a flow chart describing the cycles of the disclosed invention.

FIG. 3 is a side sectional view of a preferred example of the invention, which includes a valve system that is envisioned to be electro-mechanically controlled to manage the flow of gases through the various ports, and illustrates the stage during which air from the low pressure air compressor is being delivered into the compression chamber, thereby purging remaining exhaust gasses from a previous cycle through the exhaust valve and through the work producing expansion-engine and then through the engine's exhaust system to the atmosphere. It is noted that if the work producing expansion-engine is a piston-cylinder arrangement, it is envisioned that during the exhaust stroke of the piston, the intake and the exhaust valves of the invention's compression chamber and the exhaust valve of the work producing expansion-engine will all be open to allow the purge of the compression chamber's products of combustion through the work producing expansion-engine and out to the atmosphere.

Figure 6:
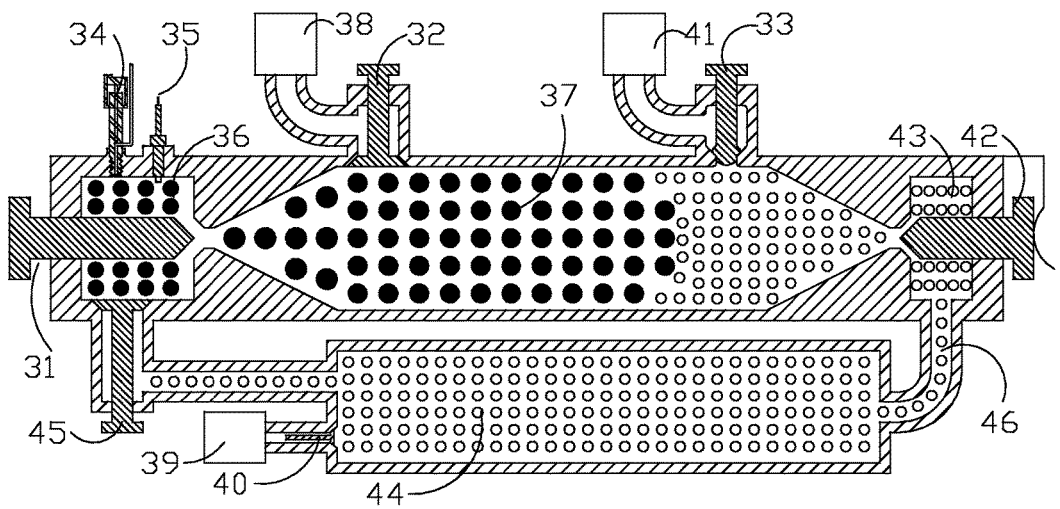
FIG. 6 is a side sectional view of the example in FIG. 5 as the products of combustion generated in the combustion chamber are released into the compression chamber. It also illustrates the compression of the resident gasses by the stratified expanding products of combustion and the resulting forcing of the resident gasses through the check valve.
Figure 7:
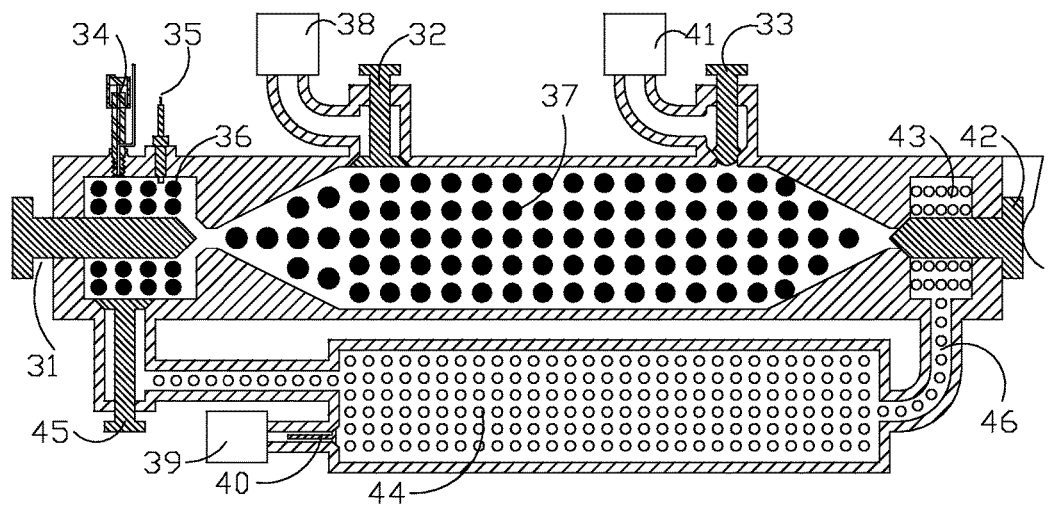

FIG. 7 is a side sectional view of the example in FIG. 6 after the products of combustion generated in the combustion chamber have been released into the compression chamber and the resident gasses have been driven out of the compression chamber and into the compressed air chamber. The check valve is closed due to an equalizing of pressure between the compression chamber and the compressed air chamber.

Figure 8:
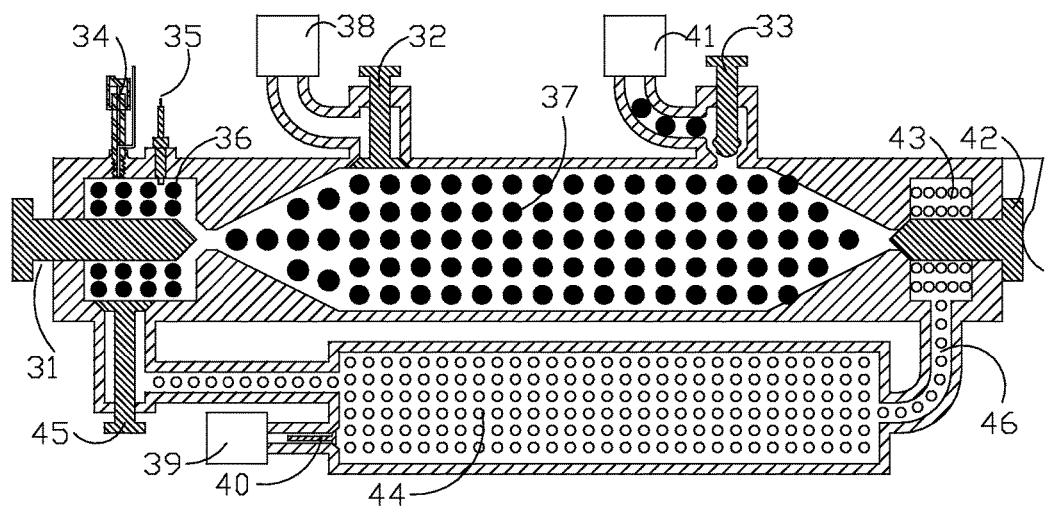

FIG. 8 is a side sectional view of the example in FIG. 7 as the products of combustion in the compression chamber are being released through the exhaust valve or port into a device that uses the products of combustion to do work (pressure multiplied by change in volume). The products of combustion will be released through the engine's exhaust system to the atmosphere after the have been used for producing work.

Figure 9:
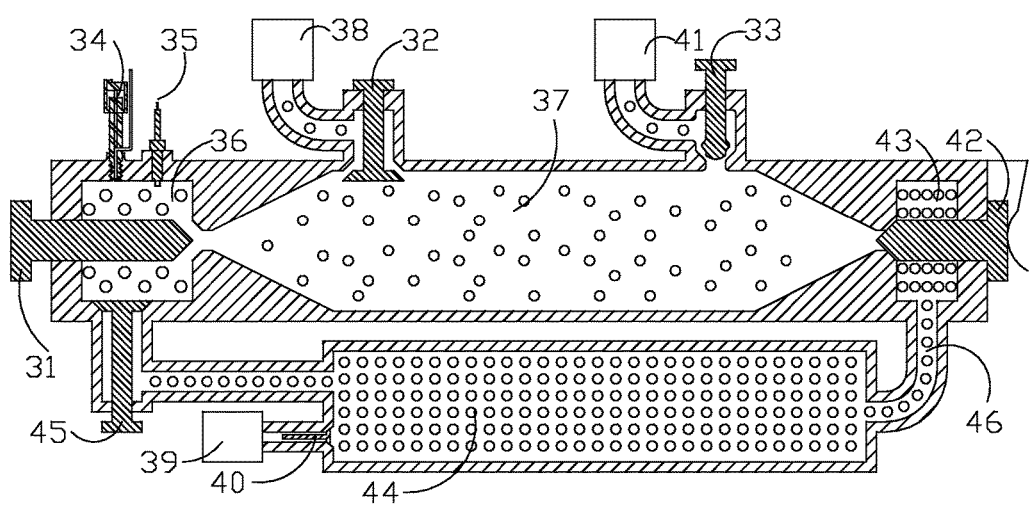

FIG. 9 is a side sectional view of the example shown in FIG. 8, where the low-pressure air compressor is being used to fill the compression chamber, thereby purging the compression chamber of most of the exhaust gasses. This results in additional resident gas that is primarily air. This state of the cycle leaves the system ready to advance to the stage illustrated in FIG. 3, and once again repeat the described cycle of events.

Figure 10:
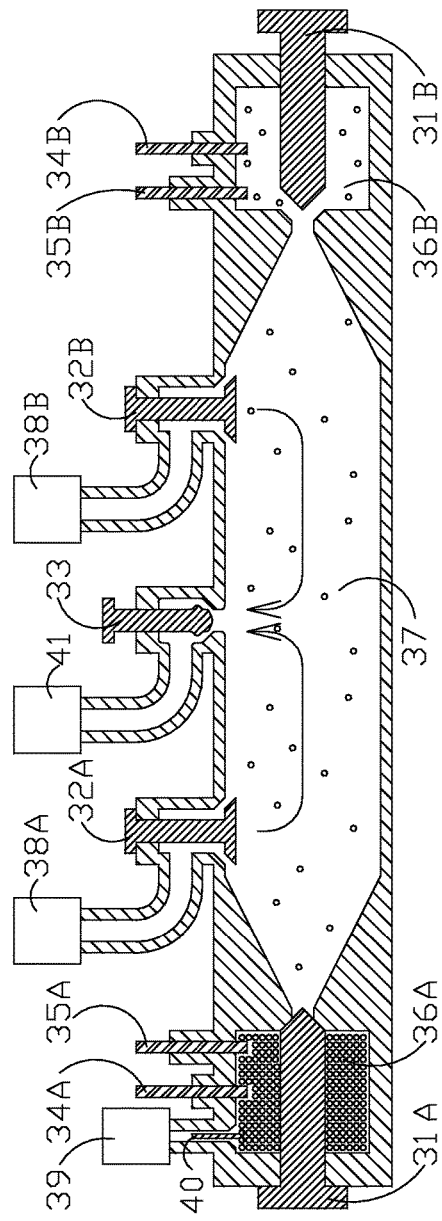

FIG. 10 is a side sectional view of an arrangement with opposing combustion chambers, and uses the principles disclosed herein to create an arrangement that is particularly useful for operating with fuels such as diesel fuel, which typically exhibit much lower vapor pressure than fuels such as gasoline, and thus benefits from higher engine temperatures and pressures for initiating combustion. This arrangement is envisioned to be a high compression-ratio design. FIG. 10 illustrates the introduction of compressed air into one of the combustion chambers. It further illustrates air or an oxygen rich gas being blown through a compression chamber to replace any gasses previously occupying the compression chamber.

Figure 11:
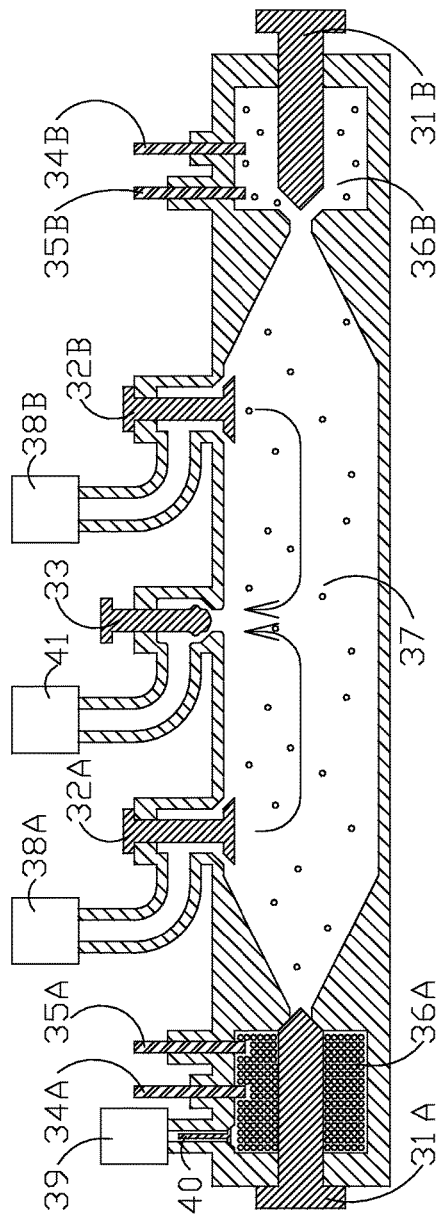

FIG. 11 illustrates the arrangement of FIG. 10 showing fuel being injected into the compressed air in one of the opposed combustion chambers.

FIG. 12 illustrates the arrangement of FIG. 11 after a mixture of fuel and air is ignited in one of the opposed combustion chambers.

FIG. 13 illustrates the arrangement of FIG. 12 and shows the advancement of the products of combustion released from the combustion chamber on the left towards the combustion chamber on the right, and illustrates the compression of gasses that resided within the compression chamber by the advancing expanding gasses just released from the combustion chamber on the left.

FIG. 14 illustrates the progress of the operation from the stage illustrated in FIG. 13, and shows the compression chamber filled with the products of combustion and the opposing combustion chamber filled with the highly compressed resident gas that had previously occupied the compression chamber.

FIG. 15 illustrates the progress of the operation from the stage illustrated in FIG. 14, with the release of the expanding products of combustion from the compression chamber through the exhaust valve, allowing the gas to continue to expand and flow through a work producing expansion-engine or other device that will allow the expansion to be used to perform useful work. This arrangement illustrated in FIG. 15 allows the opposing combustion chamber ready to continue the progress of the operation illustrated in FIG. 11, but with the functions of the combustion chambers now reversed.

FIG. 16 illustrates a side-sectional view of another embodiment employing the principles disclosed herein, and illustrates the use of an annularly-shaped compression chamber mounted between a turbine and compressor, the compressor and turbine being mounted on a single shaft that extends through the center of the annularly-shaped compression chamber.

FIG. 17 is a cut-away view of the annularly-shaped compression chamber and poppet valves, together with the other components of the disclosed invention.

Figure 18:
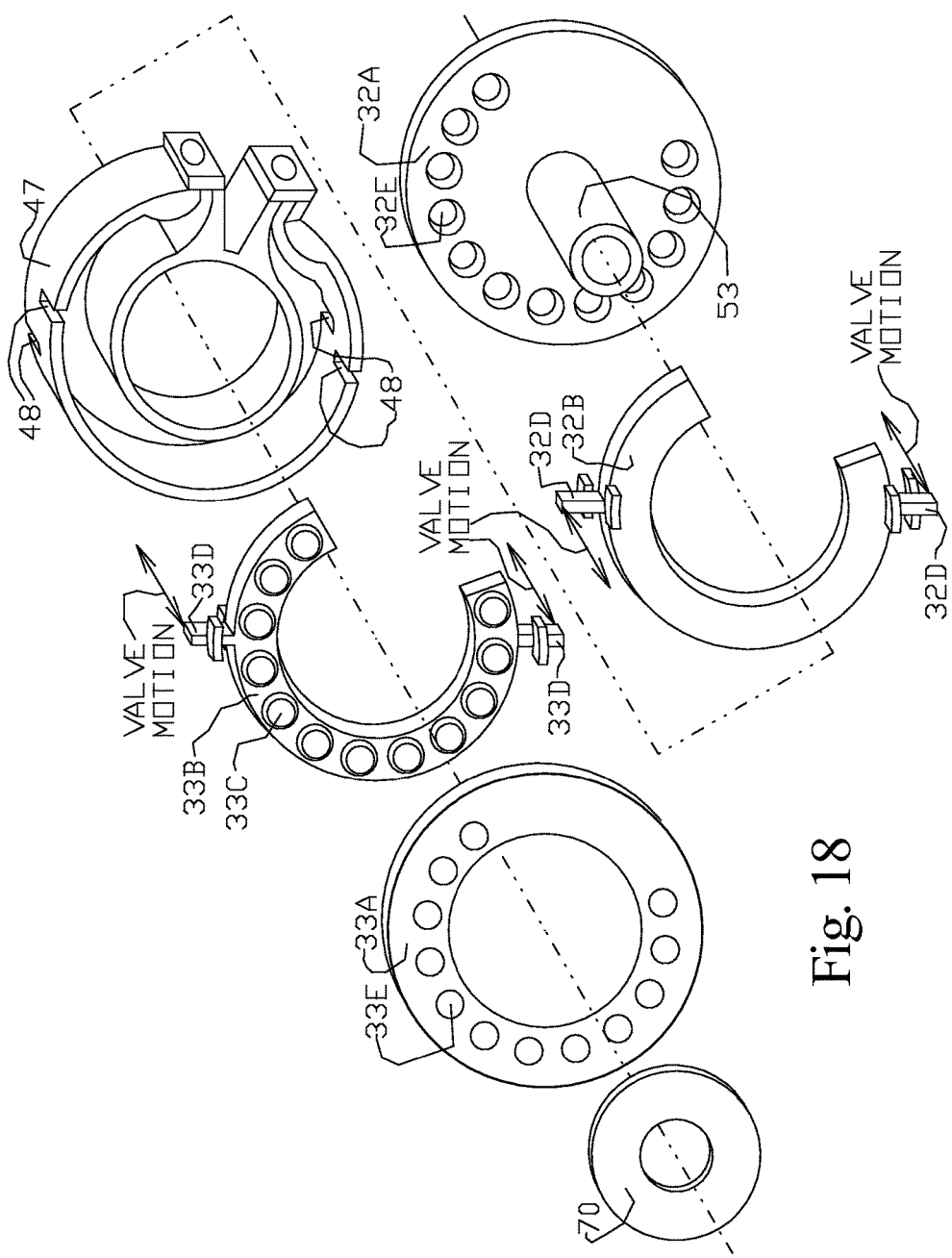

FIG. 18 is an exploded view of the main components of annularly-shaped compression chamber and the poppet valve arrangement used to exhaust the products of combustion towards the turbine and then bring air into the annularly-shaped compression chamber from the air compressor.

FIG. 19 illustrates a side-sectional view of another embodiment of the use of an annularly-shaped compression chamber mounted between a turbine and compressor, the embodiment using a slide valve arrangement instead of the poppet valve arrangement shown on FIG. 16.

FIG. 20 is a cut-away view of the annularly-shaped compression chamber and slide valves of FIG. 19, together with the other components of the disclosed invention.

Figure 21:
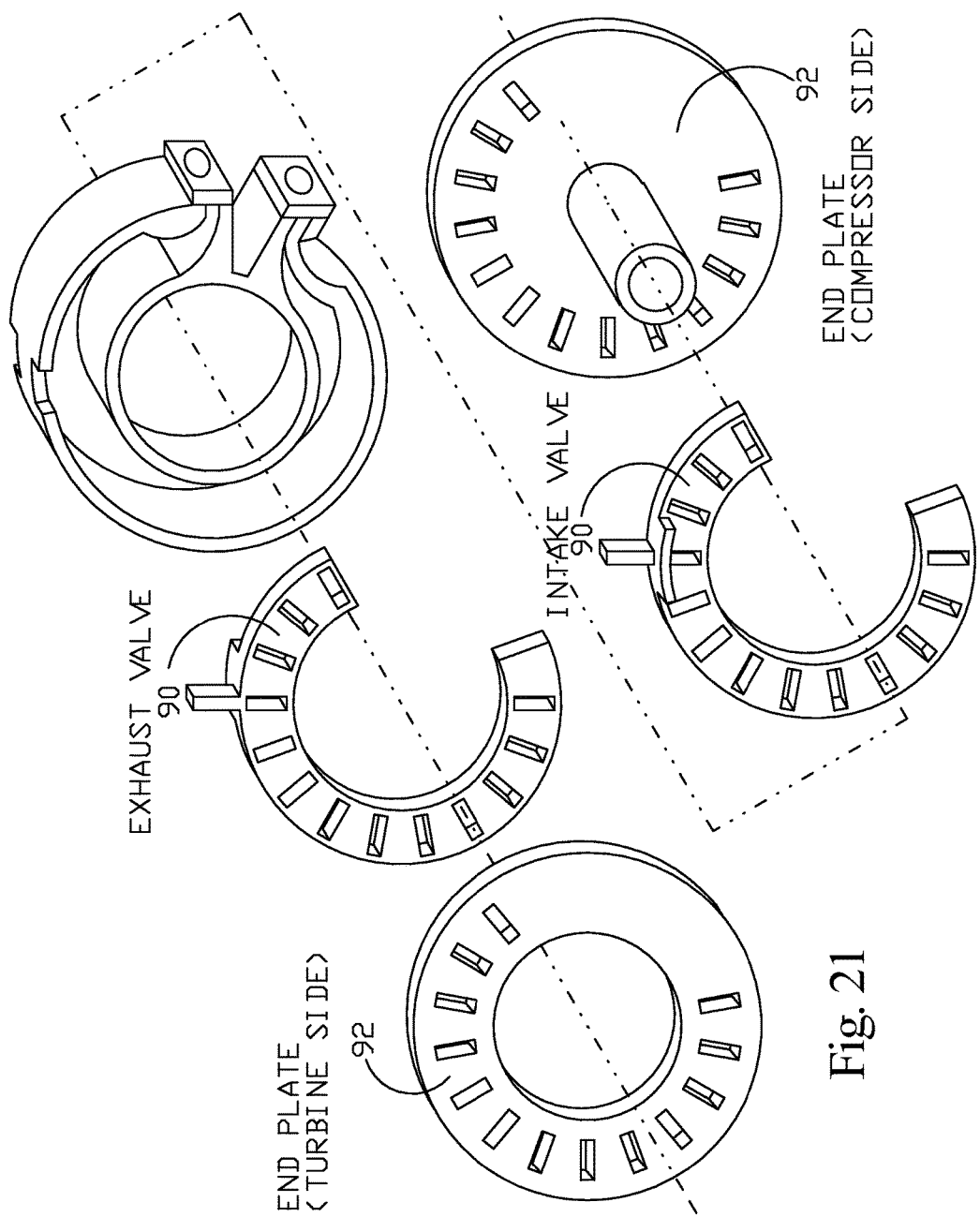

FIG. 21 is an exploded view of the main components of annularly-shaped compression chamber and the slide valve arrangement used to exhaust the products of combustion towards the turbine and then bring air into the annularly-shaped compression chamber from the air compressor.

It should be noted that cooling of the chamber walls, ports, and valves is not shown on the drawings for simplicity. Lubrication and sealing of sliding surfaces of the valves is also not shown for simplicity.

It is envisioned that a thermal barrier such as ceramic will coat surfaces that are exposed to the hot gasses in the combustion chamber(s) and the compression chamber of all embodiments of this invention. It is contemplated that this thermal barrier will be beneficial to the operating efficiency of all embodiments of this invention. The compressed air chamber may or may not have this thermal barrier. Experimentation by someone knowledgeable in the field of internal combustion will be required to determine the effects of cooling the air in the compressed air chamber on power, efficiency and the formation of unwanted exhaust pollutants such as oxides of nitrogen.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1A:
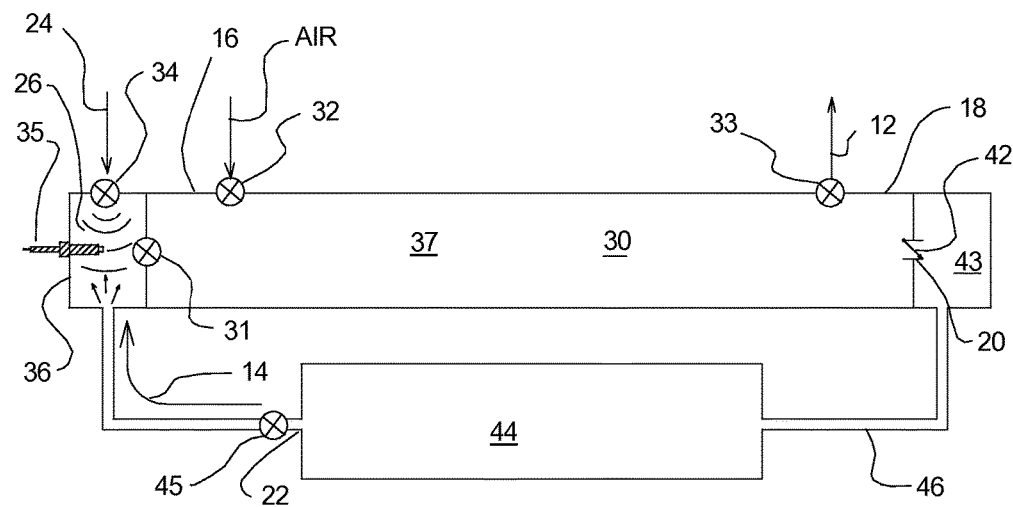
Figure 1B:
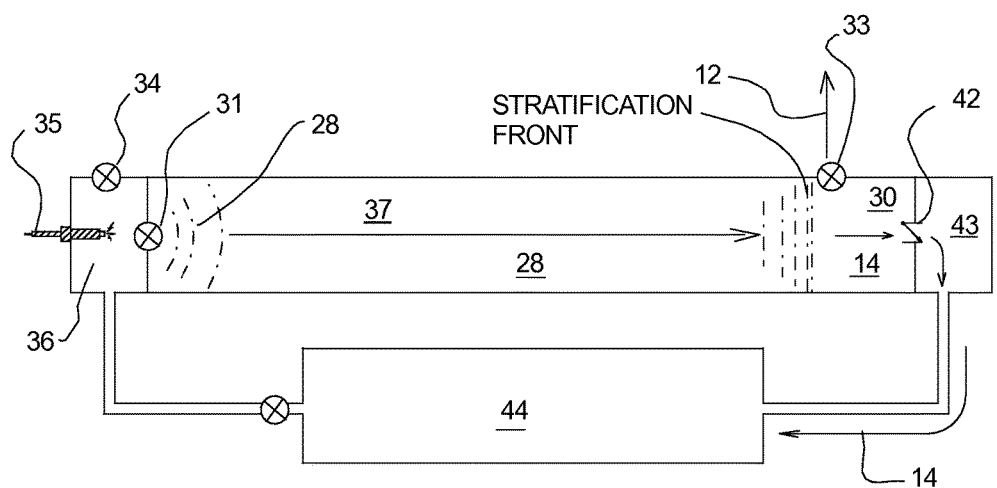
Figure 2:
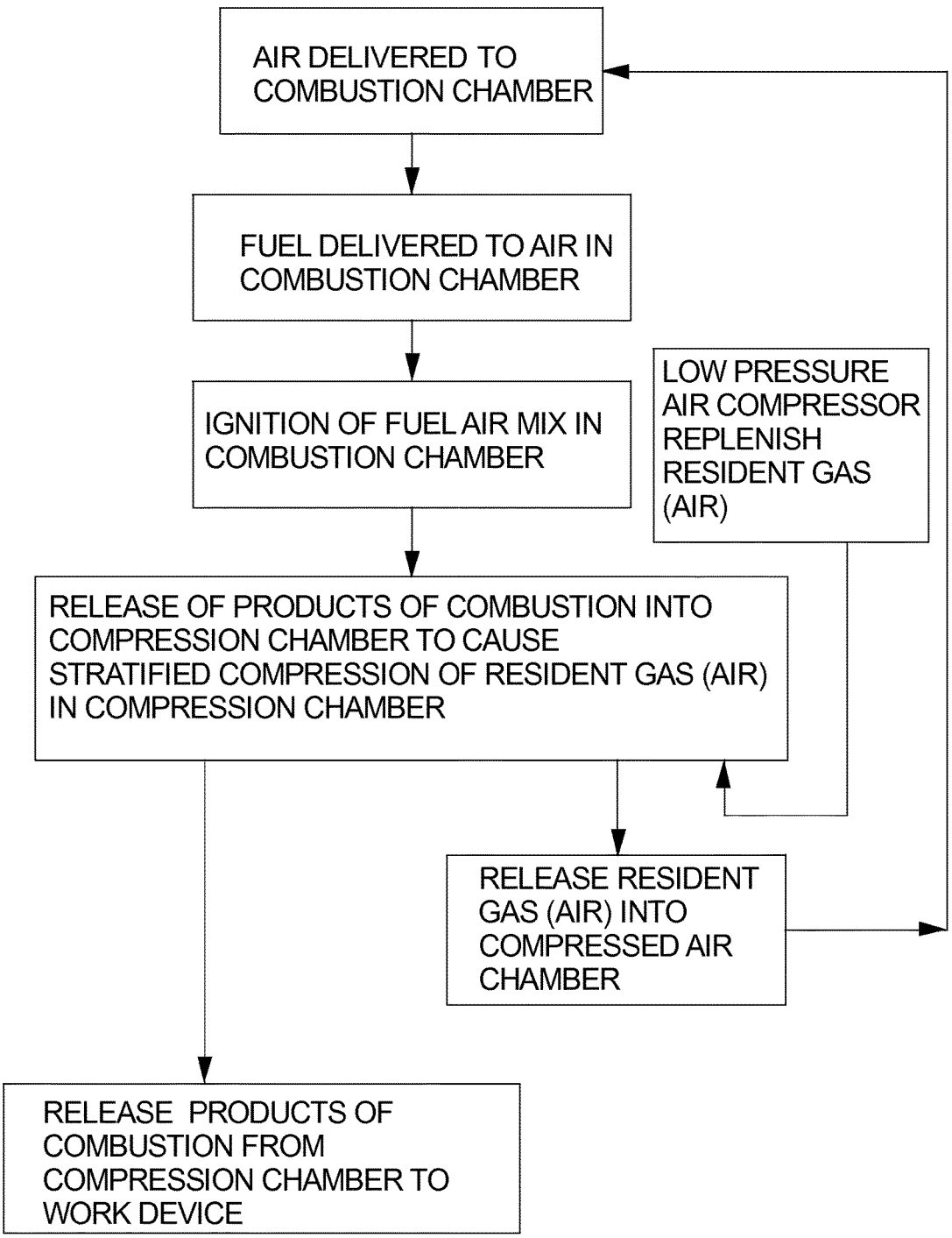

Turning now to FIGS. 1A, 1B where a schematic of a basic embodiment is shown, and to FIG. 2, where a flow diagram of steps carried out with the basic embodiment is illustrated. Referring to these figures, it will be understood that the disclosed internal combustion engine 10 is used for delivering a high pressure-high temperature exhaust gas 12 that is used to compress a resident gas 14. The resident gas 14 may be a mixture of air that is drawn into the internal combustion engine 10 from the atmosphere or a mixture of air and vestiges of the products of combustion obtained from the process carried out with the disclosed invention.

Figure 3:
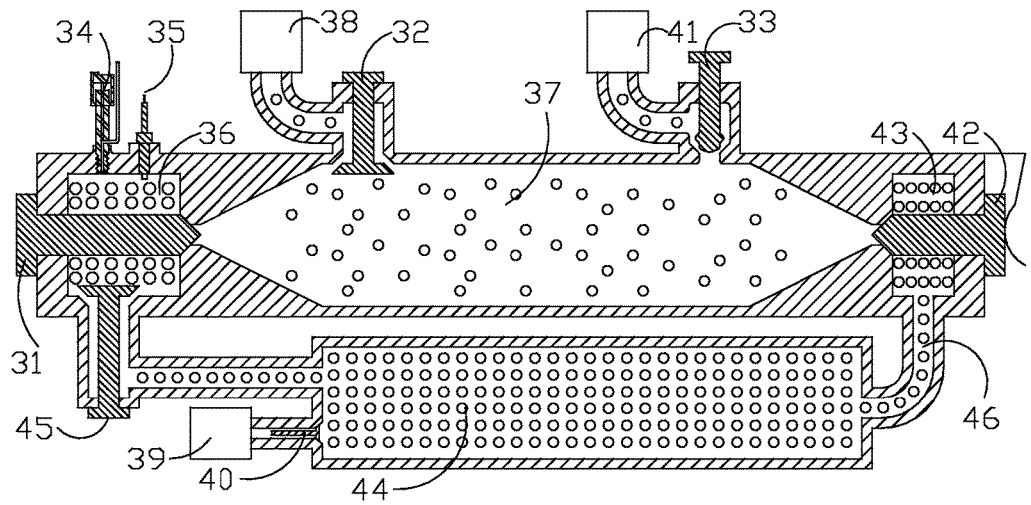

Referring now to FIGS. 1A and 3 it will be understood that disclosed internal combustion engine 10 includes an elongated compression chamber 37 that includes a first end 16 and a second end 18. The first end 16 is connected to a combustion chamber 36 though an outlet valve 31 that provides fluid communication the combustion chamber 36 and the compression chamber 37. Additionally, the second end 18 of the compression chamber 37 is connected to compressed air chamber 44 through a check valve 42. Compressed air chamber 44 has an inlet 20 and an outlet 22. The inlet 20 of compressed air chamber 44 is connected to the compression chamber 37 by way of a check valve 42, which only allows flow into the compressed air chamber. The outlet 22 of compressed air chamber 44 is in fluid communication with the combustion chamber 36 through an inlet valve 45 that is located between the combustion chamber 36 and compressed air chamber 44. FIG. 3 shows that a preferred example of the combustion chamber 36 includes a fuel injector 34 that is used for delivering a combustible fuel 24, identified in FIG. 1A, such as any suitable kerosene, gasoline, alcohol, or other hydrocarbon blend that can be burned. In the combustion chamber 36, the fuel 24 delivered by the fuel injector 34 is mixed with air from the compressed air chamber or another gas mixture that includes a suitable amount of oxygen for combustion.

It should be understood that the amount of fuel delivered by the fuel injector 34 can be regulated through the use of an oxygen sensor positioned inside the combustion chamber 36, the compression chamber 37 or in the exhaust pipe downstream of the work producing expansion-engine 41, depending on which location is the most workable. This provides the needed information for an electronic control unit (ECU), not drawn for simplicity, to calculate the proper amount of fuel to be delivered to achieve a stoichiometrically balanced, lean, or desired combustible mixture 26 that includes fuel and oxygen. The accompanying figures also show that the combustion chamber 36 will also include at least one glow plug 35 for assisting the igniting of the combustible mixture 26, shown on FIG. 4, which is formed in the combustion chamber 36 when first starting a cold engine in a high compression-ratio design or at least one spark plug in a low compression-ratio design. It is contemplated that speed control of the disclosed invention will be achieved through the adjustment of the flow through the fuel injector 34 and the outlet valve 31.

The term compression-ratio refers to the ratio of the volume of the compression chamber to the volume of the combustion chamber. A high compression-ratio design would have a higher efficiency, would require a higher pressure output of the high pressure air compressor 39 for starting, could use a lower octane rating fuel and would require a higher fuel pressure for the fuel injector 34. A low compression ratio design would have a lower efficiency, would require a lower pressure output from the High Pressure Air Compressor 39 for starting, would require a higher octane fuel rating to avoid pre-ignition or detonation, might require additional cooling of the air in the compressed air chamber 44 as well as the combustion chamber 36 walls and outlet valve 31 to avoid pre-ignition or detonation and would require a lower fuel pressure for the fuel injector 34. It is further contemplated that various designs of the combustion chamber 36 and various locations of fuel injector 34, inlet valve 45 and outlet valve 31 will allow fuel to be added to the combustion chamber 36 prior to or during the addition of the compressed air to the combustion chamber 36 without pre-ignition or detonation of the combustible mixture occurring. It is still further contemplated that in a low compression design and-or with sufficient cooling of the gas in compressed air chamber 44, fuel could be added to compressed air chamber 44 without pre-ignition or detonation occurring.

It is also contemplated that the outlet valve 31 can be located within the compression chamber 37 instead of within combustion chamber 36, as shown, without altering the functioning of this valve.

FIG. 3 shows the filling of combustion chamber 36 with compressed oxygen rich resident gas, from the compressed air chamber, which had been initially filled with compressed air from high pressure air compressor 39.

As a non-illustrated cycle-starting alternative, a high pressure air compressor 39 with an output pressure lower than the optimum system operating pressure may be used for initially starting the cycle of events to follow by holding the outlet valve 31 in the open position and holding the intake valve 32 in a closed position and also holding the exhaust valve 33 in a closed position. This will allow the high pressure air compressor 39 to fill compression chamber 37, combustion chamber 36 as well as the compressed air chamber 44 with compressed air. In this way, when fuel is introduced and ignited in combustion chamber 36, the resulting explosion will further compress in the stratified manner shown in FIG. 6 the already compressed resident gas in the compression chamber 37. Once the events described in this cycle starting alternative have been completed, the combustion-compression/expansion-exhaust-purge cycle will proceed to FIG. 7 then FIG. 8 then FIG. 9 and then back to FIG. 3 to continue the next cycle.

Figure 4:
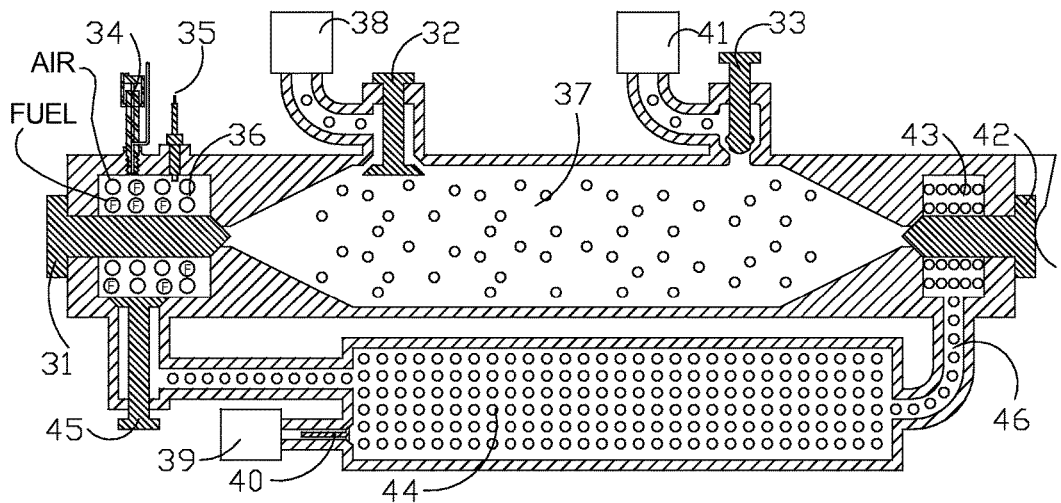
FIG. 4 is a side sectional view of the example in FIG. 3 illustrating fuel being introduced into the combustion chamber and mixing with the compressed air already present in the combustion chamber.

FIGS. 3 and 4 illustrate a stage in the operation where the exhaust valve 33 that is used to release gasses from the compression chamber 37 in order to fill the compression chamber 37 with an amount of oxygen-rich air that is to be compressed into the compressed air chamber 44. Accordingly, in FIGS. 3 and 4, the compression chamber 37 is shown at or slightly above atmospheric pressure.

Importantly, FIGS. 3 and 4 illustrate that the filling of the combustion chamber 36 is preferably achieved by first opening the inlet valve 45, which will allow compressed air, or a gas with oxygen to be used for combustion, into the combustion chamber 36. Then, as shown in FIG. 4, inlet valve 45 is closed and the fuel injector 34 is used to deliver a quantity of combustible fuel 24, identified in FIG. 1A, into the combustion chamber 36 in order to produce a combustible mixture 26. Accordingly, prior to ignition, gasses found inside the compression chamber 37 will be at or slightly above atmospheric pressure, or at pressure that is lower than the pressure of the gasses found in the combustion chamber 36 or in the compressed air chamber 44.

Figure 5:
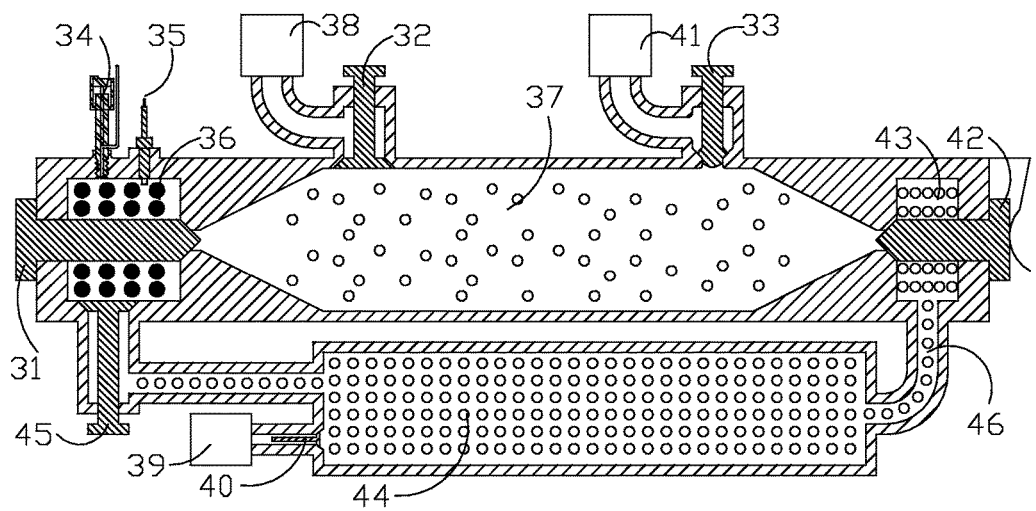
FIG. 5 is a side sectional view of the example in FIG. 4 illustrating the ignition of the fuel-air mixture either from the heat of the compressed air and/or the glow plug in a high compression-ratio design, or a spark in a low compression-ratio design. The term compression-ratio refers to the ratio of the volume of the compression chamber to the volume of the combustion chamber.

Turning now to FIG. 5 it will be understood that the heat of the compressed air and/or glow plug 35, or other ignition devices, has ignited the desired combustible mixture 26 within the combustion chamber 36. It is contemplated the combustion process will take a very short amount of time and create products of combustion 28, identified in FIG. 1B. The products of combustion 28 will consist of oxidized fuel and any other components of the combustible mixture, such as unreacted oxygen and other residual components. Although the combustion process will take a very short time, the disclosed system will allow close monitoring of the contained reaction taking place in the combustion chamber 36, which is closed while combustion is taking place, and-or monitoring the results of the reaction in the compression chamber 37 or the exhaust system of work producing expansion-engine 41. The pressure in the compressed air chamber 44 will also be monitored and that information will be fed back to the ECU to vary the amount of fuel injected as well as the other variables mentioned above to prevent the operating pressure in the compressed air chamber 44 from falling too low. This close monitoring will allow the ECU to activate the outlet valve 31 at an optimal moment and release the products of combustion 28 after allowing enough time for the desired combustion. Once the desired amount of combustion has occurred, then the products of combustion 28 are released into the compression chamber 37 by the opening of the outlet valve 31, as illustrated in FIG. 6. Also illustrated in FIG. 5, intake valve 32 and exhaust valve 33 are closed prior to the opening of outlet valve 31.

As shown in FIG. 6, the release of the products of combustion 28, identified in FIG. 1B, into the compression chamber 37 through the outlet valve 31 is now opened. As the products of combustion 28 expand into the compression chamber 37, they begin to compress any resident gasses 14, identified in FIG. 1B, found in the compression chamber 37. This compression of the resident gasses is produced by the sudden advancement of the products of combustion 28 against the resident gasses 14 in the compression chamber 37, which will result in a stratified advancement of the products of combustion 28 against the resident gasses 14. The products of combustion 28 will be at a significantly higher temperature and density than the resident gasses 14 found in the compression chamber 37, and the encounter of the two gas bodies will not provide sufficient boundary area or time for significant mixing, and thus will result in the compression of the resident gasses 14 against the second end 18, identified in FIG. 1A, of the compression chamber 37. In other words, the there will be a stratification of the gasses, which will include a layer of products of combustion 28 that presses against a layer of the resident gasses 14.

FIG. 6 also illustrates the relationship of the opening of the outlet valve 31 and the check valve 42 that is placed between the compression chamber 37 and check valve air chamber 43 that is used with the disclosed invention. As illustrated in FIGS. 3-9, check valve air chamber 43 (shown with connecting tube 46 which connects to compressed air chamber 44) is positioned downstream from the combustion chamber 36, so that all of the gasses being compressed by the discharge of the products of combustion 28, identified in FIG. 1B, into the compression chamber 37 are captured in the check valve air chamber 43 as the compressed resident gasses 14, identified in FIG. 1B, are pushed past the check valve 42 by the advancing products of combustion 28. It is important to note that it is contemplated that the exhaust valve 33 will open shortly after the outlet valve 31 releases the products of combustion 28 from the combustion chamber 36. The ratios of the volumes of the combustion chamber 36, the compression chamber 37 and the compressed air chamber 44, in conjunction with the resistance to opening of the check valve 42, will control how much and the pressure of the resident gas 14, identified in FIG. 1B, that is captured through the check valve air chamber 43 and in the compressed air chamber 44. It is envisioned that experimentation by someone knowledgeable in the field of internal combustion will be required to determine the optimum volume ratios as well as the check valve closing pressure to achieve maximum power and/or efficiency and/or reduced exhaust pollutants.

The advantage of capturing gasses in the compressed air chamber 44 is that the gas captured in this chamber will be ready for delivering to the combustion chamber 36 almost immediately after the products of combustion 28 have been delivered into the compression chamber 37. It should be noted that the larger the volume of the compressed air chamber 44, the smaller will be the decrease in pressure below the optimum operating pressure within the compressed air chamber 44 when the inlet valve 45 opens to fill combustion chamber 36 with compressed air. A review of FIGS. 3 and 4 will reveal that the resident gas 30 found in the compression chamber 37 consisted of gas, such as air, that was introduced into the compression chamber 37 by a low-pressure air compressor 38 prior to mixing fuel and an oxygen-containing gas in the combustion chamber 36. Thus, the resident gas 30, which is eventually compressed into the compressed air chamber 44 through the release of the products of combustion 28, as illustrated in FIG. 6, is introduced into the system by the low-pressure air compressor 38 before the combustion process takes place in the combustion chamber 36.

Turning now to FIGS. 7 and 8, it will be understood that the check valve 42 will close once the pressure in the check valve air chamber 43 and compressed air chamber 44 increases, due to the equalization or approximation of the pressure in the check valve air chamber 43 and the compression chamber 37, such that the pressure in the check valve air chamber 43 equals or exceeds the pressure in compression chamber 37. At this time the compressed air chamber 44 has been filled with the resident gas 30 that was displaced from the compression chamber 37 by the products of combustion 28. Now, as shown in FIG. 8, the exhaust valve 33 is opened, and the products of combustion 28 are released to the work producing expansion-engine 41, which continues to expand the products of combustion 28 to do useful work. Work producing expansion-engine 41 then exhausts those products of combustion through its exhaust system to the atmosphere, having extracted useful energy from them.

Referring now to FIG. 9, it will be understood that the exhaust valve 33 is still open after the products of combustion 28 have been released to the work producing expansion-engine 41 and the pressure inside the compression chamber 37 sufficiently reduced. At this point, the intake valve 32 is opened and the low-pressure air compressor 38 is used to fill the compression chamber 37 with air as the resident gas 30. FIG. 9 also illustrates that by leaving both the intake valve 32 and the exhaust valve 33 open for a short time, the low-pressure air compressor 38 is allowed to deliver oxygen rich air to the compression chamber 37 and at the same time purge most of the remaining products of combustion from the compression chamber 37, and thus allow the system to return to the initial position illustrated in FIG. 3 to repeat the combustion-expansion/compression-exhaust-purge cycle.

FIGS. 6-9 illustrate that the outlet valve 31 of the combustion chamber 36 remains open from the time the products of combustion are released until the purging of gasses from the compression chamber 37 is completed through the purging accomplished by the delivery of air, or another suitable oxygen-rich gas, by the low pressure air compressor. The duration of this purging can be established though the use of oxygen sensors, alone or in conjunction with temperature sensors, positioned in the compression chamber or the exhaust system of engine 41. The duration of this purging will also be determined by the frequency of the cycles, which will be controlled by the ECU which can control the speed of a motor driven cam, electrical solenoids or other electromechanical devices which will control the timing of the various valves. In this way, the speed and power output of the engine can be regulated. It is further contemplated for all embodiments of this invention, the use of valves which are opened by an increase in gas pressure operating against the closing force of a spring, and further opened by the inertia of the moving valve and then closed by the said spring may be used instead of electromechanical operation of the valves.

Once the compression chamber 37 has been satisfactorily purged of the products of combustion, and filled with air, then the intake valve 32, the exhaust valve 33, and the outlet valve 31 are closed. The closing of these valves may be achieved substantially simultaneously or in a suitable sequence, such as by first closing the exhaust valve 33, then the intake valve 32, and then the outlet valve 32. Once these valves are closed, the system is then capable of repeating the stages for combustion carried out with the disclosed invention, commencing with filling the combustion chamber 36 with compressed air from the compressed air chamber 44 through the opening of inlet valve 45 and then progressing through to the last stage, which delivers the products of combustion to a suitable device that allows further expansion and work with the expanding gasses.

Attention is now directed to FIG. 10 where a side sectional view of an arrangement with opposing combustion chambers 36A and 36B is illustrated. The opposing combustion chambers 36A and 36B are positioned on opposite ends of the compression chamber 37. As will be explained in further detail below, this arrangement allows the resident gas 30 to be compressed into one of the opposing combustion chambers 36A or 36B as a result of the release of the products of combustion from the other opposing combustion chambers 36A or 36B into the compression chamber 37. Still further, it will be understood that the opposing combustion chamber design will allow the engine or system disclosed here to generate and thus operate at higher temperatures and pressures, conditions that are particularly useful for operating with fuels such as diesel fuel, which typically exhibit much lower vapor pressure than fuels such as gasoline, and thus benefit from higher engine temperatures and pressures for initiating combustion.

Accordingly, as illustrated in FIG. 10, high pressure air compressor 39 forces compressed air past check valve 40 to fill combustion chamber 36A with compressed air. High pressure air compressor 39 may now shut down, having done its job for starting the cycle of events to follow. Intake valves 32A and 32B and exhaust valve 33 are open to introduce oxygen rich gas from low pressure air compressor 38A and 38B, through compression chamber 37 and through engine 41 and through the exhaust system of engine 41 to the atmosphere.

As a cycle starting alternative, a high pressure air compressor 39 with a lower output pressure may be used for starting the cycle of events to follow by holding output valve 31A in the open position and intake valves 32A and 32B and exhaust valve 33 are held in the closed position. This will allow high pressure air compressor 39 to fill compression chamber 37 and combustion chamber 36B as well as combustion chamber 36A with compressed air. In this way, when fuel is introduced and ignited in combustion chamber 36A, the resulting explosion will further compress the already partially-compressed resident gas in compression chamber 37 and combustion chamber 36B. Once the events described in this cycle-starting alternative have been completed, the combustion-compression/expansion-exhaust-purge cycle will proceed to FIG. 14.

Illustrated in FIG. 11, a combustible mixture 26 is generated in the combustion chamber 36A by delivering an amount of fuel with fuel injector 34A into an amount of compressed air or oxygenated gas in the combustion chamber 36A.

As shown in FIG. 12, the combustible mixture 26 is ignited through the use of a glow plug 35A, in order to create the products of combustion 28. Also as illustrated in FIG. 12, intake valves 32A and 32B and exhaust valve 33 are now closed. Compression chamber 37 is occupied with an oxygen rich resident gas.

As illustrated in FIG. 13, the products of combustion are then released into the compression chamber 37 by the opening of the outlet valve 31A, which in the illustrated preferred embodiment is a solenoid actuated valve or a linearly-actuated valve with a low pressure closing spring so that the valve may operate as a (one way) check valve when closed. It is also important to note that the outlet valves 31A and 31B used in the opposing combustion chamber arrangement will incorporate the solenoid, linear retraction, mechanism and will also be used to perform the check-valve function that is provided by the check valve 42 of the embodiment illustrated in FIGS. 1A-9. Accordingly, in the opposing combustion chamber example, the check valve function may be performed by a separate check valve (one-way valve) or by a solenoid that is spring-loaded to the closed position, and which can then be opened by an electric signal to release the products of combustion from the combustion chamber.

FIG. 13 also illustrates the advancement of the products of combustion 28 against the resident gas 14 when the products of combustion 28 are released from combustion chamber 36A towards the opposing combustion chamber 36B. The rapid advancement of the products of combustion 28 towards the resident gas 14 will result in the compression of the resident gasses 14 against the outlet valve 31B and the displacement of these gasses towards the opposing combustion chamber 36B. The check valve function of outlet valve 31B of the opposing combustion chamber 36B will open under the pressure and allow the resident gas that is being displaced by the products of combustion 28 to enter the opposing combustion chamber 36B. As discussed above, it is contemplated that outlet valve alone may perform both functions of acting as a check valve to accept the resident gas and an outlet valve for the products of combustion being released from one of the combustions chambers.

Turning now to FIG. 14 it will be understood that the outlet valve 31B will close once the pressure within the combustion chamber 36B reaches the pressure of the compression chamber 37, which has filled with the products of combustion 28 released from the combustion chamber 36A. Thus, the pressure in both of the combustion chambers 36A and 36B, and compression chamber 37 will be substantially equal at the stage illustrated in FIG. 14. Combustion chamber 36B is occupied with high pressure, high temperature oxygen rich gas.

FIG. 15 illustrates the progress of the operation from the stage illustrated in FIG. 14, with the release of the expanding products of combustion from the compression chamber 37 through the exhaust valve 33. This allows the gas to continue to expand and flow through a work producing expansion-engine 41 that is connected to the disclosed invention in order to perform useful work. Note that at the stage illustrated in FIG. 15, it is preferred that the outlet valve 31A of the combustion chamber 36A, which was just allowed to release products of combustion into the compression chamber 37, is allowed to remain open. This allows evacuation of the products of combustion 28 from the compression chamber 37 and from the combustion chamber 36A. The evacuation of the products of combustion 28 from the compression chamber 37 is accomplished by introducing air or another oxygen-rich gas through the intake valves 32A and 32B.

It is contemplated that in the preferred embodiment of the invention, a single low-pressure air compressor will be used instead of two or more low-pressure air compressors by connecting an intake manifold from a single low pressure air compressor to both intake valves 32A and 32B, which are positioned relative to exhaust valve 33 in order to expeditiously purge the compression chamber 37 of products of combustion and fill the compression chamber 37 with oxygen rich gas. It is further contemplated that additional intake valves may be positioned within combustion chambers 36A and 36B to assist in purging those chambers as well to obtain a possible higher power output of the invention. The additional intake valve in the combustion chamber 36A or 36B would open at the same time intake valves 32A and 32B are open and, importantly, when the outlet valve associated with that combustion chamber is open.

Once the products of combustion from both the compression chamber 37 and the combustion chamber 36A have been or are being evacuated, fuel can be injected into the compressed air, or resident gas, found in combustion chamber 36B, and thus the steps illustrated in FIGS. 11-15 can be repeated, this time with the combustion and generation of products of combustion 28 being generated in the combustion chamber 36B. The products of combustion generated in combustion chamber 36B are then released and used to compress the resident gas or air found in the compression chamber 37 into combustion chamber 36A, as the process proceeds in the reverse direction ending at FIG. 11 where a new cycle begins. It is now explained that FIG. 10 is shown for the initial starting of the process or system.

In the embodiment shown in FIGS. 16, 17 and 18, the combustion-expansion/compression-exhaust-purge cycle described in FIGS. 1 through 9 is duplicated. It should be noted that the embodiment shown in FIGS. 10 through 15 can also be incorporated into the embodiment shown in FIGS. 16, 17 and 18 as well as the embodiment shown in FIGS. 19, 20 and 21, by placing combustion chambers 36A and 36B, as shown in FIGS. 10-15, at opposite ends of the annular shaped compression chamber 37. The shapes and locations of the components are changed to create a different embodiment of the same invention.

Referring now to FIGS. 16 and 17, it will be understood that while it is contemplated that the compression chamber 37 shown in the earlier embodiments of this invention will be made as an elongated cylindrical member, it is also contemplated that the compression chamber 37 may be formed in a generally circular or annular manner as shown in FIG. 17. The annular configuration of FIG. 17 allows the use of a low-pressure air compressor 38 that is mounted on a shaft 52 that also supports and is attached to the turbine 41 that is used to perform work with the expanding products of combustion released through the exhaust valve apertures or ports located in exhaust gas plate 33A. Thus, by referring to FIG. 16, it will be understood that an annularly shaped compression chamber 37 has been shown mounted between a turbine 41 and a low pressure air compressor 38. FIG. 16 also shows that the low pressure air compressor 38 and turbine 41 are mounted on a single shaft 52 that extends through a central support bearing 53 or aperture that is incorporated into an intake gas plate 32A and a bearing support plate 70. Intake gas plate 32A and exhaust gas plate 33A form the sides of the annular shaped compression chamber 37 and have tapered holes 32E and 33E which function as intake and exhaust valve apertures and valve seats as shown in FIG. 18. The intake valve plate 32B and the exhaust valve plate 33B located within the annular shaped compression chamber 37 are part-circular in shape and extend in an arc from a point near a connection to outlet valve 31 to a point near a connection to check valve 42. Intake valve plate 32B and exhaust valve plate 33B have an inside radius greater than and an outside radius less than the corresponding radii of intake gas plate 32A and exhaust gas plate 32B. The function of the resulting gaps is to allow gasses to flow through these gaps when the intake valve plate 32B and exhaust valve plate 33B are moved linearly away from the intake gas plate 32A and exhaust gas plate 33A, respectively. Intake valve plate 32B and exhaust valve plate 33B have attached tapered poppet valves 32C and 33C, respectively, which are shown as button-like tapered cylinders. These poppet valves 32C and 33C mate with the tapered holes 32E and 33E in intake gas plate 32A and exhaust gas plate 33A, respectively. As shown in FIGS. 16 and 18, the intake valve plate 32B is positioned nearest the low pressure air compressor 38 with its attached poppet valves 32C mating with the tapered holes 32E in intake gas plate 32A. Exhaust valve plate 33B is positioned nearest turbine 41 with its attached poppet valves 33C mating with the tapered holes 33E in exhaust gas plate 33A. As shown in this embodiment, intake gas plate 32A and exhaust gas plate 33A are attached to the center housing 47, shown in FIGS. 16 and 18. As shown, center housing 47 contains the inside radius wall and outside radius wall forming compression chamber 37. It also contains a shape at one end of compression chamber 37 which adapts the square or rectangular cross section of the compression chamber 37 to the circular cross section of outlet valve 31, and a similar shape at the other end of compression chamber 37 which adapts the square or rectangular cross section of the compression chamber 37 to the circular cross section of the check valve 42, such as the check valve 42 used in the example illustrated in FIG. 3. Also shown formed into the central housing 47 are four valve-guide slots 48 which mate with the intake and exhaust valve plate operating tabs 32D and 33D shown attached to the tops and bottoms of intake valve plate 32B and exhaust valve plate 33B. There are additional arched plates attached to the tabs 32D and 33D which provide the function of sealing of the slots from gas leakage while the intake valve plate 32B and the exhaust valve plate 33B move as shown by the arrows which indicate valve motion in FIG. 18.

It is stated at this time that although the compression chamber 37's cross sectional shape is envisioned as a rectangle or square, and the inlet valve 31, check valve 42, combustion chamber 36, check valve air chambers 43 and compressed air chamber 44 have been shown to have cross sectional shapes to be circular, it is contemplated that other shapes may be used without destroying the functionality of these chambers. This statement also applies to the chamber shapes of the other embodiments presented herein.

Shown in FIG. 17 is the combustion chamber 36, used to create the high pressure, high temperature products of combustion in other examples of the invention disclosed here. Similarly, the check valve air chamber 43 and the compressed air chamber 44, with the connecting tube 46, accept compressed resident gas from the annularly shaped compression chamber 37 through a check valve 42, which operates similar to the check valve 42 used in the previous example of the invention illustrated in FIG. 3.

An advantage of mounting the low pressure air compressor 38 on a first side of the annularly shaped compression chamber 37, and the turbine 41 axially located on a second side of the annularly shaped compression chamber 37, is that the low pressure air compressor 38 will provide more compressed air as the quantity of exhaust gasses increases and the speed of turbine 41 increases. In other words, the increased output of exhaust will be matched with an increase in low-pressure compressed air to more rapidly purge the products of combustion in the compression chamber 37 out through the exhaust valve apertures formed in exhaust gas plate 33A. This action is similar to the purging action described by FIG. 9 in the earlier presented embodiment. It is contemplated that with this embodiment, the multiple intake valves and exhaust valves combined with the short distance for the purging gasses to travel from the low pressure air compressor through the intake valve apertures, then axially through the compression chamber 37 and then through the exhaust valve apertures to purge the compression chamber 37, will result in a higher frequency of combustion-expansion/compression-exhaust-purge cycles than an embodiment with a longer travel distance from intake to exhaust apertures. This will result in a higher power output than an embodiment with fewer intake and exhaust valves and-or a longer purge gas travel distance between intake and exhaust apertures. Also, the direct connection of the compressor 68 and the turbine 71 provides a particularly compact, low-weight device that is capable of high power output. Also, because the energy of the exhaust gasses has been reduced by the work performed by the compression of the resident gas in the compression chamber 37, the temperature of these exhaust gasses has been reduced so less cooling of the turbine blades will be required and the need for turbine blade materials which can operate at high temperatures is reduced.

Referring now to FIGS. 16-18, and particularly FIG. 18, it will be understood that the intake gas plate 32A and the exhaust gas plate 33A will provide a plurality of valve apertures. The intake valve apertures 32E, shown as tapered holes in intake gas plate 32A, will mate with the intake poppet valves 32C, shown as button-like tapered cylinders that are mounted on the intake valve plate 32B. As can be understood from FIG. 18, the intake valve plate 32B moves towards and away from the intake gas plate 32A in order to close or open the valve apertures that face the high-pressure side of the low pressure air compressor 38.

FIGS. 16 and 18 also show that the exhaust valve plate 33B is used to support the attached exhaust poppet valves 33C. Exhaust poppet valves 33C are used to open and close the exhaust valve apertures 33E found in the exhaust gas plate 33A. As illustrated in FIG. 16, the exhaust poppet valves mounted on the exhaust valve plate 33B will mate with the valve apertures 33E found in the exhaust gas plate 33A to control the exit of the products of combustion from the annularly shaped compression chamber 37. The products of combustion 28 will then immediately encounter the turbine 41 as they leave the annularly shaped compression chamber 37 through the valve apertures in the exhaust gas plate 33A.

Turning now to FIGS. 19-20, it will be understood that the disclosed example with an annularly shaped compression chamber 37 may incorporate sliding valves 90, instead of poppet valves as was illustrated in FIGS. 16-18. FIGS. 20 and 21 illustrate the placement of the sliding valves 90 along the annularly shaped compression chamber 37 as well as the angular sliding movement of the slotted valve plates 92 to achieve the opening and closing of the slotted valves. Angular movement, that is, rotation about the axis of rotation of the shaft of the turbine 41 allows the slotted valve plates 92 to either allow air into the annularly shaped compression chamber 37 or exhaust gasses out of the compression chamber 37 towards the turbine 41.

It should be noted that cooling of the chamber walls, ports, and valves is not shown on the drawings for simplicity. It is contemplated that cooling of the compressed air chamber could be beneficial. Accordingly, a heat exchanger as well as a pressure sensor may be used with the compressed air chamber 44 of all of the illustrated examples that use a compressed air chamber. Lubrication and sealing of sliding surfaces of the valves is also not shown for simplicity.

Thermal barriers such as ceramic coatings of the combustion chamber walls the outlet valve the compression chamber walls and other surfaces in contact with hot gasses are contemplated as beneficial to the engine's efficiency but are not shown for simplicity.

It will be understood that the disclosed system involves few moving mechanical parts for the production of high-pressure gasses that are then made available for performing work through further expansion. This simple arrangement allows computerized control of timing of activation all of the valves used for the control of the flow of gasses.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. An internal combustion engine for delivering an exhaust gas to a work producing expansion-engine for performing useful work with a resident gas, the internal combustion engine comprising:
    an elongated compression chamber adapted for holding a resident gas, the compression chamber having a first end and a second end, the first end of the compression chamber being connected to a combustion chamber; the second end of the compression chamber being connected to a compressed air chamber that has an inlet and an outlet, the inlet of the compressed air chamber being in fluid communication with the compression chamber through an entry valve that is located between the compression chamber and the inlet of compressed air chamber, the outlet of the compressed air chamber being in fluid communication with the combustion chamber through an inlet valve that is located between the combustion chamber and the compressed air chamber;
    the combustion chamber further having a fuel igniter and an outlet valve, that is in fluid communication with the compression chamber and adapted for quickly releasing products of combustion from the combustion chamber into the compression chamber, so that products of combustion released from the combustion chamber expand against the resident gas in the compression chamber to compress the resident gas, so that the compressed resident gas in the compression chamber, is then forced pass the check valve and into the compressed air chamber, so that the products of combustion remaining in the compression chamber are now available for further expansion in a work producing expansion-engine for performing useful work.

2. An internal combustion engine according to claim 1, wherein the igniter is a spark plug, glow plug and/or the high temperature resulting from the compression of the compressed air.

3. An internal combustion engine according to claim 1 and further comprising a one-way check valve connected from the second end of the compression chamber, the check valve providing selective fluid communication from the compression chamber to a compressed air chamber, the compressed air chamber having an outlet that provides selective delivery of gasses from the compressed air chamber to the combustion chamber.

4. An internal combustion engine for delivering an exhaust gas to work producing expansion-engine for performing useful work with a resident gas, the internal combustion engine comprising:
    an elongated compression chamber adapted for holding a resident gas, the compression chamber having a first end and a second end, the first end of the compression chamber being connected to a combustion chamber;
    the second end of the compression chamber being connected to a compressed air chamber that has an inlet and an outlet, the inlet of the compressed air chamber being in fluid communication with the compression chamber through an entry valve that is located between the compression chamber and the inlet of compressed air chamber, the outlet of the compressed air chamber being in fluid communication with the combustion chamber through an inlet valve that is located between the combustion chamber and the compressed air chamber;
    the combustion chamber further having a fuel igniter, and an exhaust valve, that is in fluid communication with the compression chamber and adapted for quickly releasing exhaust gasses from the combustion chamber into compression chamber, so that exhaust gasses released from the combustion expand against the compression chamber to compress the resident gas, so that the compressed resident gas in the compression chamber, is then available for further expansion in a work producing expansion-engine for performing useful work.

5. A method for creating a supply of contained pressurized gas through combustion, and delivering the pressurized gas to a work producing expansion-engine, the method comprising:
    providing an elongated compression chamber having a first end and a second end, the first end being connected to a combustion chamber that includes an outlet valve that is in fluid communication with the compression chamber, the second end of the compression chamber being connected to a compressed air chamber that has an inlet and an outlet, the inlet of the compressed air chamber being connected to the compression chamber through a one-way check valve that is located between the compression chamber and the compressed air chamber, and the outlet of the compressed air chamber being in fluid communication with the combustion chamber through a selectively controllable inlet valve that is located between the combustion chamber and the compressed air chamber, so that gasses held within the compressed air chamber are selectively delivered into the combustion chamber; the combustion chamber further having a fuel injector for delivering a combustible fluid to the combustion chamber and at least one igniter for assisting the compressed air in igniting a fuel and air mixture in the combustion chamber;
    delivering a combustible fluid into the combustion chamber;
    delivering a gas having oxygen into the combustion chamber to create a combustible fluid and oxygen mixture in the combustion chamber;
    igniting the combustible fluid and air mixture in the combustion chamber to create an amount of pressurized products of combustion gasses; and, delivering the pressurized products of combustion gasses to the compression chamber by rapidly opening an outlet valve that is in fluid communication with the compression chamber, so that products of combustion gasses created in the combustion chamber are rapidly released in a manner that creates a minimum amount of turbulence in the products of combustion flowing into the compression chamber and expand against the resident air in the compression chamber and compressing the resident air in the compression chamber to create compressed air in the compression chamber, so that the compressed resident air in the compression chamber may be captured in the compressed air chamber and stored for use in a following combustion cycle, with the products of combustion gasses remaining in the compression chamber then being released through the exhaust valve for performing useful work through expansion in a work producing expansion-engine.

* * * * *